US012711609B1

(12) United States Patent
Schneeweiss et al.

(10) Patent No.: US 12,711,609 B1
(45) Date of Patent: Aug. 18, 2026

(54) DEFECT DETECTION SYSTEM

(71) Applicant: Krevera Inc., Newton, MA (US)

(72) Inventors: Edward Sebastian Schneeweiss, Newton, MA (US); Nicolas Sebastian Arango, Somerville, MA (US)

(73) Assignee: Krevera Inc., Newton, MA (US)

( * ) Notice: Subject to any disclaimer, the term of this patent is extended or adjusted under 35 U.S.C. 154(b) by 0 days.

(21) Appl. No.: 19/530,699

(22) Filed: Feb. 5, 2026

Related U.S. Application Data

(60) Provisional application No. 63/914,603, filed on Nov. 10, 2025.

(51) Int. Cl.
*G06T 7/00* (2017.01)
*G06V 10/764* (2022.01)
*G06V 10/774* (2022.01)

(52) U.S. Cl.
CPC ............ *G06T 7/001* (2013.01); *G06V 10/764* (2022.01); *G06V 10/774* (2022.01); *G06T 2207/20081* (2013.01); *G06T 2207/30108* (2013.01)

(58) Field of Classification Search
CPC ........... G06T 7/001; G06T 2207/20081; G06T 2207/30108; G06V 10/764; G06V 10/774
USPC ........................................................ 381/141
See application file for complete search history.

(56) References Cited

U.S. PATENT DOCUMENTS 7,218,772 B2 * 5/2007 Gleason ................ G06T 7/0004 700/110
2019/0096135 A1 * 3/2019 Dal Mutto ........ G06F 18/24765
2022/0318667 A1 * 10/2022 Babu Balasubramani ................. G06N 3/04

* cited by examiner

*Primary Examiner* — Huy C Ho
(74) *Attorney, Agent, or Firm* — Fish & Richardson P.C.

(57) ABSTRACT

A method for training a defect-detection model for inspecting an inspection object includes generating defective inspection object data and defective material parameter data, generating at least one pair of a defective image and a non-defective image corresponding to the defective image based on inspection object data, the defective inspection object data, the defective material parameter data, and scene parameter data, comparing the defective image with the non-defective image, generating a visibility score of the at least one defect based on the comparison of the defective image with the non-defective image, classifying the visibility score as first, second, and third categories based on the visibility score and, based on the classification of the visibility score of the at least one defect, performing one or more training-data determination actions.

20 Claims, 10 Drawing Sheets

GENERATING DEFECTIVE INSPECTION OBJECT DATA AND DEFECTIVE MATERIAL PARAMETER DATA;
501

GENERATING AT LEAST ONE PAIR OF A DEFECTIVE IMAGE AND A NON-DEFECTIVE IMAGE BASED ON INSPECTION OBJECT DATA, THE DEFECTIVE INSPECTION OBJECT DATA, THE DEFECTIVE MATERIAL PARAMETER DATA, AND SCENE PARAMETER DATA, WHEREIN THE DEFECTIVE IMAGE OF THE AT LEAST ONE PAIR INCLUDES A FIRST IMAGE PORTION WITH AT LEAST ONE DEFECT OF AN INSPECTION OBJECT, AND A SECOND IMAGE PORTION WITHOUT THE AT LEAST ONE DEFECT OF THE INSPECTION OBJECT.
502

COMPARING THE DEFECTIVE IMAGE WITH THE NON-DEFECTIVE IMAGE.
503

GENERATING A VISIBILITY SCORE OF THE AT LEAST ONE DEFECT BASED ON THE COMPARISON OF THE DEFECTIVE IMAGE WITH THE NON-DEFECTIVE IMAGE.
504

CLASSIFYING THE VISIBILITY SCORE AS:
(I) A FIRST CATEGORY BASED ON THE VISIBILITY SCORE BEING EQUAL TO OR GREATER THAN A FIRST VISIBILITY THRESHOLD VALUE;
(II) A SECOND CATEGORY BASED ON THE VISIBILITY SCORE BEING EQUAL TO OR GREATER THAN A SECOND VISIBILITY THRESHOLD VALUE AND LESS THAN THE FIRST VISIBILITY THRESHOLD VALUE; OR
(III) A THIRD CATEGORY BASED ON THE VISIBILITY SCORE BEING LESS THAN THE SECOND VISIBILITY THRESHOLD VALUE.
505

BASED ON THE CLASSIFICATION OF THE VISIBILITY SCORE OF THE AT LEAST ONE DEFECT, PERFORMING ONE OR MORE TRAINING-DATA DETERMINATION ACTIONS, WHEREIN THE ONE OR MORE TRAINING-DATA DETERMINATION ACTION COMPRISES USING DATA REGARDING THE AT LEAST ONE DEFECT FOR TRAINING A DEFECT-DETECTION MODEL AND EXCLUDING THE DATA REGARDING THE AT LEAST ONE DEFECT FROM TRAINING THE DEFECT-DETECTION MODEL.
506

*FIG. 5*

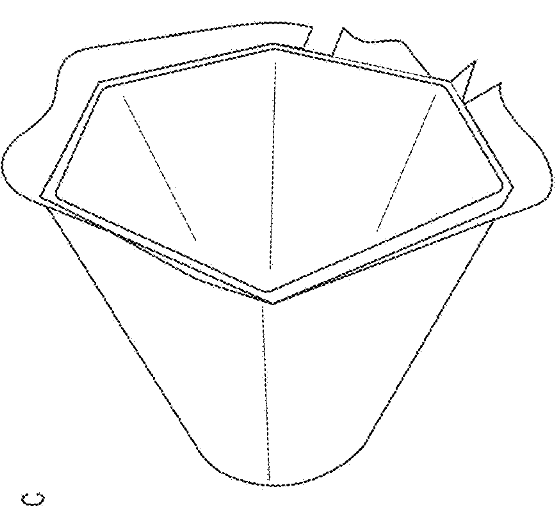
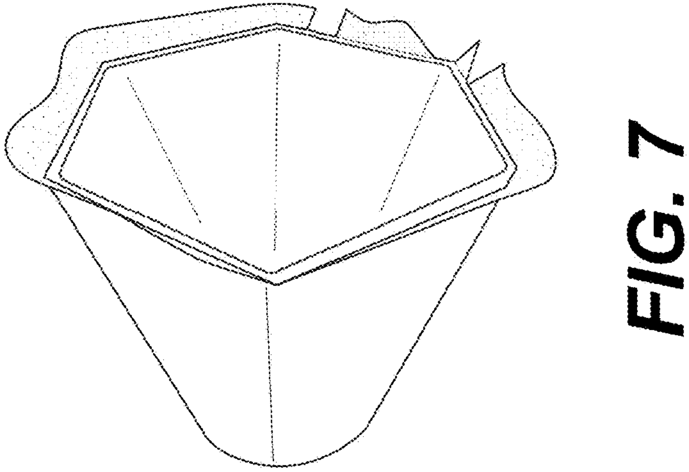
*FIG. 7*
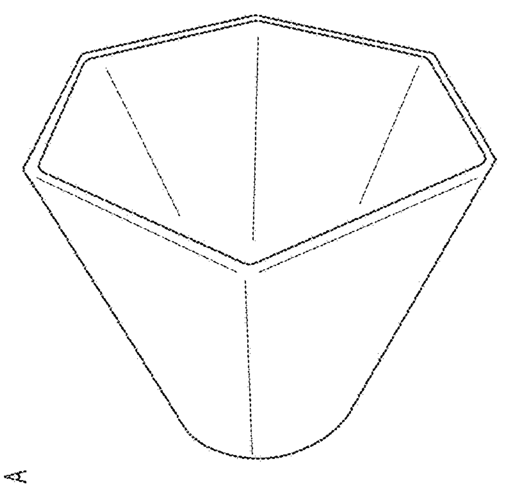

DEFECT DETECTION SYSTEM

CROSS-REFERENCE TO RELATED APPLICATION

This application claims priority to a U.S. Provisional Application, Ser. No. 63/914,603, filed on Nov. 10, 2025, the entire contents of which are incorporated herein by reference.

BACKGROUND

Injection molding is a widely used manufacturing process for producing complex plastic components with high precision and repeatability. It is commonly employed in industries such as automotive, consumer electronics, medical devices, and packaging. Despite its advantages, injection molding is susceptible to various types of defects, including short shots, flash, sink marks, warping, and surface blemishes.

These defects can compromise the structural integrity, functionality, and aesthetic quality of the final product. Some quality control methods in injection molding often rely on manual inspection or periodic sampling, which can be time-consuming, inconsistent, and prone to human error.

SUMMARY

Aspects of the present disclosure relate to systems and methods for generating and using synthetic training data to train a defect-detection model for inspecting an inspection object.

In some implementations, a method for training a defect-detection model for inspecting an inspection object may include generating defective inspection object data and defective material parameter data, generating at least one pair of a defective image and a non-defective image based on inspection object data, the defective inspection object data, the defective material parameter data, and scene parameter data. The defective image of the at least one pair may include a first image portion with at least one defect of an inspection object, and a second image portion without the at least one defect of the inspection object. The method may further include comparing the defective image with the non-defective image, generating a visibility score of the at least one defect based on the comparison of the defective image with the non-defective image, classifying the visibility score as: (i) a first category based on the visibility score being equal to or greater than a first visibility threshold value; (ii) a second category based on the visibility score being equal to or greater than a second visibility threshold value and less than the first visibility threshold value; or (iii) a third category based on the visibility score being less than the second visibility threshold value. The method may further include, based on the classification of the visibility score of the at least one defect, performing one or more training-data determination actions. The one or more training-data determination action may include using data regarding the at least one defect for training a defect-detection model and excluding the data regarding the at least one defect from training the defect-detection model.

In some implementations, the non-defective image of the at least one pair may include a third image portion corresponding to the first image portion of the defective image and without the at least one defect of the inspection object, and a fourth image portion that is a same as the second image portion of the defective image.

In some implementations, the method may further include receiving, by the one or more processors, inspection object data, defect data from a defect library, and material data from a material library, and generating the defective inspection object data and the defective material parameter data may include generating the defective inspection object data and the defective material parameter data based on the inspection object data, the defect data, and the material data.

In some implementations, comparing the defective image with the non-defective image may include comparing the defective image and the non-defective image within a ground-truth defect segmentation mask using a pixel-wise difference metric.

In some implementations, the at least one defect may include a plurality of defects, and generating the visibility score of the at least one defect may include generating the visibility score for each of the plurality of defects.

In some implementations, using the data regarding the at least one defect for training the defect-detection model may include using the data regarding the at least one defect for training the defect-detection model based on the visibility score being classified into the first category.

In some implementations, excluding the data regarding the at least one defect from training the defect-detection model may include excluding the data regarding the at least one defect from training the defect-detection model based on the visibility score being classified into the third category.

In some implementations, the one or more training-data determination actions may include masking the at least one defect from loss computation for training the defect detection model based on the visibility score being classified into the second category.

In some implementations, a system for training a defect-detection model for inspecting an inspection object may include memory; one or more processors in communication with the memory, wherein the one or more processors are configured to: generate defective inspection object data and defective material parameter data; generate at least one pair of a defective image and a non-defective image based on inspection object data, the defective inspection object data, the defective material parameter data, and scene parameter data, wherein the defective image of the at least one pair may include a first image portion with at least one defect of an inspection object, and a second image portion without the at least one defect of the inspection object, compare the defective image with the non-defective image, generate a visibility score of the at least one defect based on the comparison of the defective image with the non-defective image, classify the visibility score as: (i) a first category based on the visibility score being equal to or greater than a first visibility threshold value; (ii) a second category based on the visibility score being equal to or greater than a second visibility threshold value and less than the first visibility threshold value; or (iii) a third category based on the visibility score being less than the second visibility threshold value; and based on the classification of the visibility score of the at least one defect, perform one or more training-data determination actions, wherein the one or more training-data determination action may include using data regarding the at least one defect for training a defect-detection model and excluding the data regarding the at least one defect from training the defect-detection model.

In some implementations, one or more non-transitory computer-readable storage media including instructions that, when executed by one or more processors, may cause the one or more processors to: generate defective inspection object data and defective material parameter data; generate at least one pair of a defective image and a non-defective image based on inspection object data, the defective inspection object data, the defective material parameter data, and scene parameter data, wherein the defective image of the at least one pair may include a first image portion with at least one defect of an inspection object, and a second image portion without the at least one defect of the inspection object, compare the defective image with the non-defective image, generate a visibility score of the at least one defect based on the comparison of the defective image with the non-defective image, classify the visibility score as: (i) a first category based on the visibility score being equal to or greater than a first visibility threshold value; (ii) a second category based on the visibility score being equal to or greater than a second visibility threshold value and less than the first visibility threshold value; or (iii) a third category based on the visibility score being less than the second visibility threshold value; and based on the classification of the visibility score of the at least one defect, perform one or more training-data determination actions, wherein the one or more training-data determination action may include using data regarding the at least one defect for training a defect-detection model and excluding the data regarding the at least one defect from training the defect-detection model.

The details of one or more implementations of the systems and methods are set forth in the accompanying description below. Other features, objects, and advantages of these systems and methods will be apparent from the description and drawings, and from the claims.

BRIEF DESCRIPTION OF THE DRAWINGS

FIG. 5 is a flowchart illustrating a process for training a defect detection model for inspecting an inspection object.

FIG. 7 illustrates example rendered images showing the process for generating a simulated flash defect.

DETAILED DESCRIPTION

Figure 1:
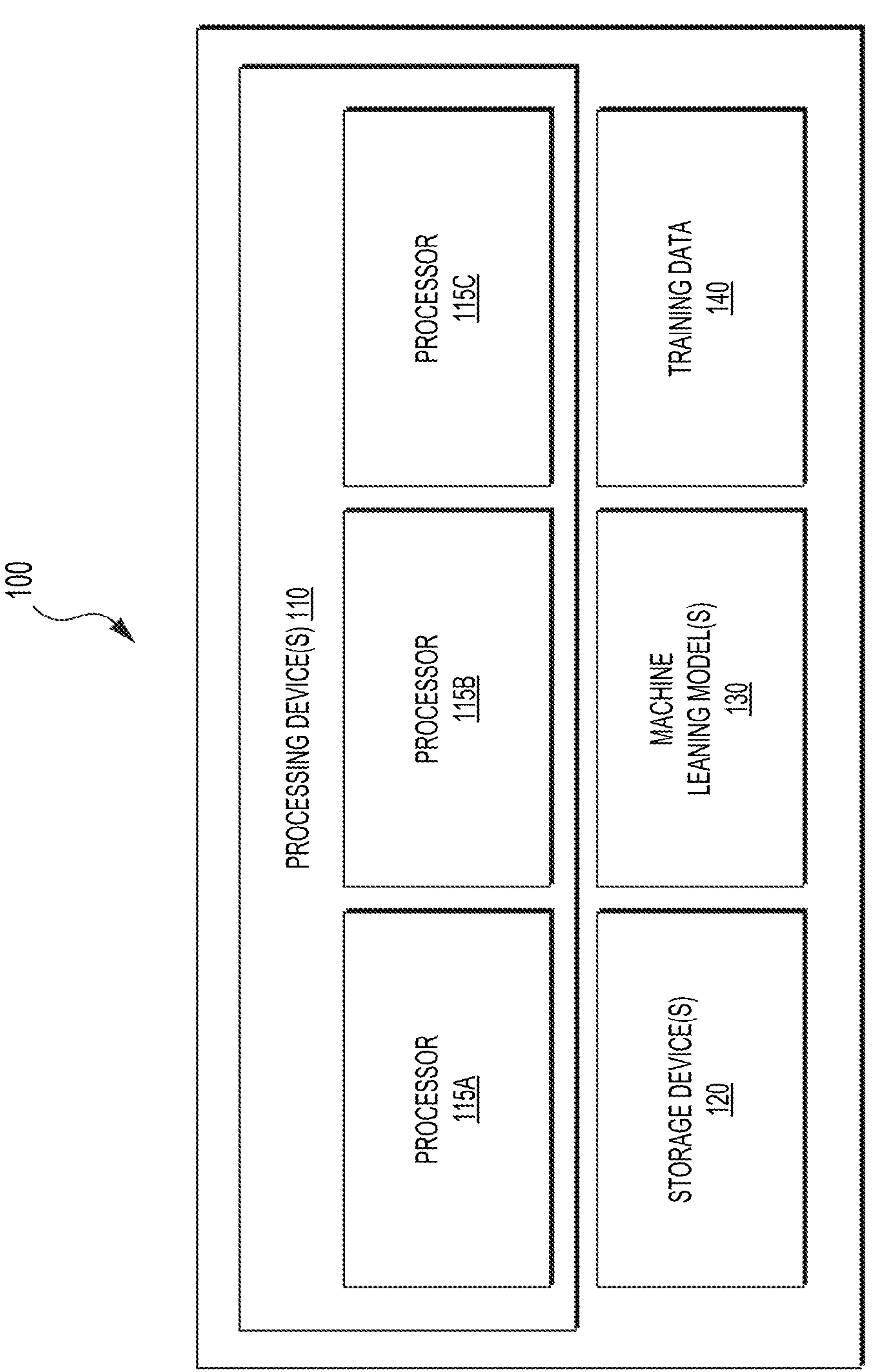
FIG. 1 illustrates an example system for training and/or implementing a defect detection model for inspecting an inspection object.

Aspects of the present disclosure provide systems and methods for generating high-quality synthetic training data for training a defect-detection model that can be used to inspect manufactured products.

The defect detection system according to aspects of the present disclosure may perform automated (100%) inspection, for a range of pre-determined defect categories, of manufactured products. Sensor data, acquired (shortly) after the manufacture of a product, may be processed under soft real-time constraints using deep learning models to determine defect status, defect category, defect segmentations, and optional defect metadata, such as size, count, and severity. Deep learning model output may be used to make accept-reject decisions on individual products.

Deep learning models may be trained on synthetic data produced through physics-based rendering of simulated defective products. Synthetic data may be generated using a synthetic data generation pipeline that take digital information describing the product which may include product CAD, surface finish, visual appearance, inspection setting, manufacturing methodology, expected defects, and a control plan regarding acceptance criteria. Once deployed, detection decisions made by the deep learning model may be corrected and incorporated into a dataset alongside synthetic data for model fine tuning.

The synthetic data generation pipeline may take a customer specification of their inspection object, quality control plan, and inspection setting and produce datasets of synthetic datapoints suitable for training a machine learning model for classifying and segmenting product defects.

Customer specifications may be used to construct input data and configuration for the synthetic data generation pipeline. Product CAD files may be converted to mesh representations using standard algorithms for ease of rendering and defect application. Product material specifications may be processed to construct a digital material specification for accurate rendering. The product inspection settings may configure the scene library from which scenes in which the product may be rendered may be selected.

Once configured, defects associated with the manufacturing methodology of the inspection object may be selected from a defect library and algorithmically applied to the inspection object. Defect parameters may be randomized according to configuration derived from the inspection object control plan. A subset of defects may relate to the inspection object geometry and may be reflected in the defective inspection mesh output of the defect applier. Other defects may be visual in nature and may be reflected in the defective material parameters output of the defect applier. Additionally, the inspection scene selected from a scene library and its parameters may be randomized according to synthetic datapoint generation configuration.

The inspection object mesh and its associated material parameters, the defective inspection mesh and its associated material parameters, and the scene parameters may be passed to a physics-based renderer to produce a synthetic datapoint. Synthetic datapoint output may include a render of the defective product and a corresponding segmentation, a render of the non-defective product rendered under identical scene conditions, and metadata pertaining to the defects and the scene. Defect metadata may include information about the size, severity, and location of a defect. Material metadata may describe material randomizations of the product, and scene metadata may describe randomized properties of the scene, including randomized sensor locations and the presence of additional objects. Segmentations of the rendered defective and non-defective products may spatially discriminate between the background scene, the inspection object, and defects on the inspection object.

When training a defect detection model using synthetic data, one of the principal challenges may be determining whether a simulated defect is actually visible to a given sensor modality. Although the rendering engine provides complete geometric ground truth, including whether a defect lies within a sensor's view frustum and whether it may be occluded by other geometry, this information alone may not guarantee that the defect will be perceptible in the resulting sensor data.

Defects may occur in regions of low illumination, heavy shadow, specular glare, or other lighting configurations that obscure visual evidence. In some cases, the defect signal may be so subtle relative to its surroundings that it may not be readily discernible to a human observer under typical inspection conditions. Training a model on such imperceptible or ambiguous examples can destabilize learning and encourage incorrect predictions in visually uncertain regions.

To address this challenge, each synthetic scene may be rendered twice, once with the defect present and once without. The resulting pair of images may be compared using both a ground-truth defect segmentation and a pixel-wise difference metric to evaluate defect visibility. This comparison may identify whether the defect produces a perceptible change under the given scene parameters and sensor characteristics.

A visibility check may then be performed to determine a magnitude of change across a defect region. Two visibility thresholds may be defined to categorize defect visibility: (i) when the magnitude of change is above a first visibility threshold, the defect may be deemed visible and may contribute to the model's supervised loss; (ii) when the magnitude of change is below a second visibility threshold, the defect may be considered invisible and may be excluded from training; and (iii) when the magnitude of change falls between the first and second visibility thresholds, the defect visibility may be considered ambiguous, in which case the defect may be masked from loss computation to prevent the model from learning unstable or uncertain associations.

This visibility filtering process may ensure that the dataset reflects only reliably observable defects, thereby improving model convergence and preventing bias introduced by imperceptible or borderline examples. The resulting processed synthetic dataset may retain accurate labels and stable supervision for visually valid defect cases.

In some implementations, the trained defect detection model may receive sensor data of the inspection object as input. The sensor data may include one or more RGB images captured from a single viewpoint or from multiple synchronized viewpoints. Depending on the inspection configuration, other sensing modalities, such as depth, thermal, hyperspectral, or polarized imaging, may also be used as input.

From the input sensor data, the model may produce multiple categories of predictions, including global predictions and spatial predictions. Global predictions may be computed at the level of the inspection object and may describe whether each defect category is present and, if so, an estimated severity of that defect. These outputs may provide object-level defect classification and severity scoring. Spatial predictions may be produced in the coordinate domain of the sensor modality. For vision-based inputs, the model may generate a two-dimensional segmentation mask indicating precise pixel regions where each defect may be detected. In other configurations, spatial predictions may be produced in three-dimensional coordinates or another sensor-specific representation.

The combined outputs of the model, including global and spatial predictions, may provide a complete description of a defect state for the inspection object. These outputs may be post-processed and aggregated with metadata, such as defect type, size, and location, to support automated decision-making in downstream inspection and rejection systems.

In some implementations, the inspection system may receive three primary inputs: sensor data, trained model weights, and a customer control plan. The sensor data, including images captured by cameras positioned within an inspection cell, may provide visual information required for defect detection. The trained model weights may represent or may be an output of a deep learning model previously trained on synthetic datasets generated by the system. The customer control plan may define a set of defect categories considered during inspection, as well as severity thresholds used to determine whether a product should be accepted or rejected.

In some implementations, based on these inputs, the system may output a binary rejection decision signal. The rejection decision signal may be transmitted to connected factory automation equipment to physically remove or divert defective parts that exceed defined rejection criteria.

In some implementations, the inspection system may be located on premises near the inspection cell, adjacent to cameras and an injection molding machine (IMM). Cameras may be mounted along a path through which parts exit the IMM and positioned to capture complete views of each product as the product is presented for inspection. When triggered by the factory automation system, the cameras may acquire images that may be immediately processed by the defect detection model. The model may produce predictions describing the presence, category, and severity of detected defects.

A decision engine may evaluate the model predictions in conjunction with the customer control plan. The decision engine may apply specified acceptance criteria to determine whether an inspected product meets quality standards. For example, if the model predicts the presence of flash extending 1 cm from a part surface and the customer specification defines an allowable limit of 0.5 cm, the decision engine may determine that the part should be rejected. Following this determination, the system may communicate a rejection signal to connected automation equipment.

The inspection system may communicate with external factory automation equipment through a digital input/output (IO) interface. This interface may provide real-time coordination between the inspection system and a manufacturing line. Timing, triggering, and synchronization parameters may be configured within the system to ensure that inspection, decision-making, and rejection signals are aligned with a machine cycle state and physical handling of parts.

In some implementations, the inspection system may interface with factory automation equipment, such as a robot or conveyor, through a 24-volt digital IO connection. The connection may include a set of configurable input and output pins. Input pins may be used to receive trigger signals from factory equipment, indicating when to capture sensor data and perform inspection. Output pins may be used to transmit inspection results in the form of accept or reject signals. These signals may be used by the automation equipment to execute appropriate physical handling of an inspected part immediately following the inspection process.

In some implementations, aspects of the present disclosure may be used to inspect a variety of products and materials, including injection-molded components, glass, and metal.

Aspects of the present disclosure may provide a concrete technological improvement to automated manufacturing inspection, for example, by improving how defect-detection models are trained and deployed in real-world inspection environments. In particular, aspects of the present disclosure address a technical problem specific to computer-visionbased inspection systems, namely, that defects which are geometrically present may not be perceptible to inspection sensors under actual lighting, material, and viewing conditions, and that training machine-learning models on such imperceptible or ambiguous defects can degrade model accuracy and operational reliability.

By generating paired defective and non-defective renders under identical scene conditions and performing a (contrast-based) visibility analysis to selectively include, exclude, or mask defect labels during training, the disclosed techniques produce defect-detection models that are more stable, more accurate, and better aligned with physical inspection outcomes. These improvements enable reliable real-time inspection decisions that directly control factory automation equipment to accept or reject manufactured parts, thereby reducing false rejects, preventing missed defects, minimizing waste, and improving throughput in industrial production lines. Accordingly, aspects of the present disclosure are directed to a practical application that improves the functioning of computer-based inspection systems and manufacturing processes.

FIG. 1 illustrates an example system 100 configured to implement operations for generating synthetic training data, performing visibility analysis, and/or training one or more defect-detection models, according to some implementations of the present disclosure. As shown, the system 100 may include one or more processing devices 110, one or more storage devices 120, one or more machine learning models 130, and training data 140. Although illustrated as a single system, the components of the system 100 may be distributed across multiple computing systems, devices, or cloud-based resources.

The processing device(s) 110 may include any suitable processing devices capable of executing computer-executable instructions, such as one or more central processing units (CPUs) and/or graphics processing units (GPUs). For example, the processing device(s) 110 may include one or more processors 115A, 115B, and 115C, which may operate individually or cooperatively to perform the functions of the system 100 described herein (e.g., synthetic defect generation, image rendering, defect visibility scoring, threshold-based classification, and/or training-data determination operations). In some implementations, different processors may be configured for different computational roles. For example, CPUs for scene configuration, GPUs for rendering and pixel-wise difference operations, and dedicated processors for machine-learning inference or training.

The storage device(s) 120 may include one or more computer-readable media, such as solid-state drives, magnetic disks, optical storage, flash memory, or any other suitable volatile or non-volatile storage devices. The storage device(s) 120 may store data described herein for the system 100 (e.g., inspection object data, defect library data, material library data, scene parameter data, synthetic image pairs, segmentation masks, visibility-score results, and other information used in generating and validating synthetic datapoints). In some implementations, storage device(s) 120 may additionally store pre-trained model parameters, configuration files for the visibility-checking pipeline, or historical datasets used for the system 100.

In some implementations, the machine learning model(s) 130 may represent any defect-detection model trained using synthetic data generated according to the methods described herein or any other suitable modes described herein. Examples of the machine learning model(s) 130 may include a convolutional neural network, a transformer-based architecture, a hybrid model, or any other model capable of generating spatial predictions (e.g., segmentation masks) and/or global predictions (e.g., defect type and severity scores). In some implementations, the machine learning model(s) 130 may be trained using (only) the synthetic datapoints, for example, deemed visibility-valid pursuant to the multi-threshold visibility-classification process, which will be described in detail below.

The training data 140 may be used to train the machine learning model(s) 130. The training data 140 may include validated synthetic datapoints, for example, generated by comparing defective and non-defective image pairs of the same inspection scene and determining whether each applied defect is visible, ambiguous, or invisible. The training data 140 may include, for example, RGB images, segmentation masks, associated defect metadata, scene metadata, and defect-visibility classifications used to determine whether the datapoints are used for model training, excluded from training, or masked from loss computation.

Although FIG. 1 illustrates discrete functional blocks, the depicted architecture is merely an example. In other implementations, any of the components of FIG. 1 may be combined, subdivided, executed remotely, or replaced with alternative computing components without departing from the scope of the present disclosure.

Figure 2:
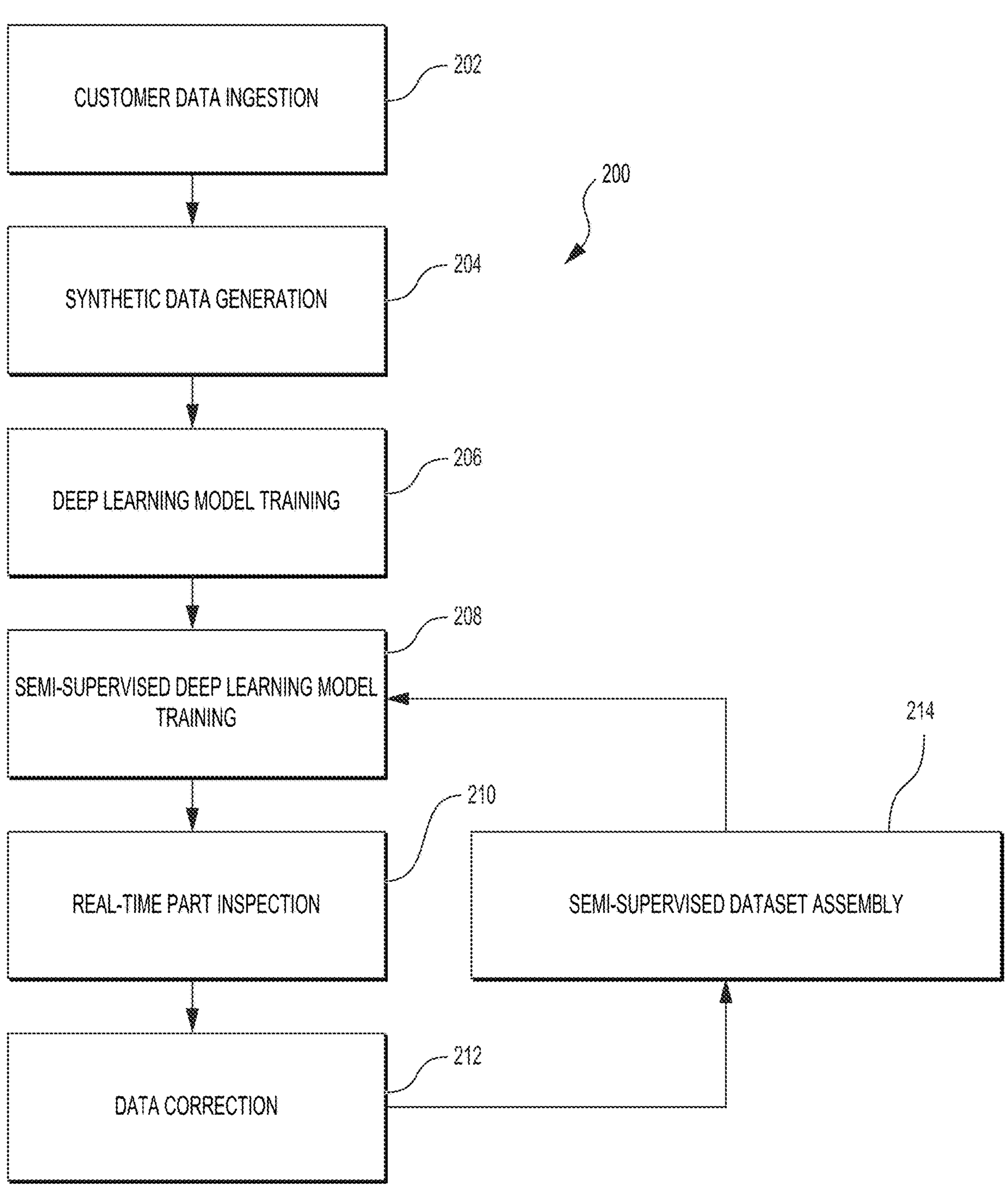
FIG. 2 is a flowchart illustrating a process for training a defect detection model for inspecting an inspection object.

FIG. 2 illustrates an example process 200 for generating synthetic training data, training a defect-detection model, and incorporating real-world inspection feedback into subsequent training cycles, according to some implementations of the present disclosure. The illustrated process 200 may be executed by one or more computing systems, such as the system 100 shown in FIG. 1, and/or by any distributed combination of cloud-based and on-premises computing resources.

At block 202, the system 100 may perform customer data ingestion, in which customer-provided information may be received and processed. The customer data may include product specifications, quality control plans, and/or inspection settings. The product specifications may include Computer Aided Design (CAD) files, manufacturing methodology of the inspection object, the material of the inspection object, data regarding colorants added to the inspection object, and/or inspection object surface finishes. The quality control plans may include defect categories (e.g., defects to inspect for) and/or defect thresholds (e.g., go/nogo thresholds on numerical quantities relating to these defects). The inspection settings may include inspection-environment parameters (e.g., expected product orientations, description of connected automation equipment, camera placement and lighting configuration). This information may be used to configure a synthetic data generation pipeline tailored to the customer's product and inspection requirements.

At block 204, the system 100 may perform synthetic data generation based on the ingested customer data. Synthetic data generation may include generating defective inspection object data, applying one or more geometric or appearance-based defects from a defect library, randomizing material and scene parameters, and rendering multiple views of defective and non-defective versions of the inspection object. In some implementations, the synthetic data may include pairs of images rendered with identical scene parameters except for application of a defect, along with segmentation masks and metadata describing each defect.

At block 206, the system 100 may train a deep learning model (e.g., machine learning model 130) using the generated synthetic data. The training may include supervised learning using validated synthetic datasets, visibility-checked defect labels, and defect-segmentation masks. The deep learning model may be configured to output spatial predictions and/or global defect predictions based on the synthetic data.

At block 208, the system 100 may perform semi-supervised deep learning model training, in which additional training data, for example, potentially including real-world inspection data, may be incorporated to refine the model. Semi-supervised training may be used to adapt the model to customer-specific inspection environments, lighting conditions, product orientations, or other real-world variations not fully represented in synthetic data alone. The semi-supervised dataset used for this stage may be assembled at block 214.

At block 210, the system 100 may perform real-time part inspection using the trained or semi-supervised deep learning model (e.g., machine learning model 130). For example, during factory operation, images captured by one or more sensors (e.g., RGB cameras, depth sensors, thermal sensors, or other modalities) may be evaluated to determine whether defects are present on a newly produced inspection object.

At block 212, the system 100 may perform data correction. For instance, the system 100 may identify misclassifications, ambiguous detections, or corrections to the model's predictions, for example, using user inputs, operator confirmations, or automated verification processes. These corrections may be fed back into the system to refine future training data.

At block 214, the system 100 may perform semi-supervised dataset assembly. In this step, corrected real-world inspection results and associated image data may be combined with synthetic data to generate an updated dataset. This dataset may include both labeled and pseudo-labeled data, and may be used for subsequent semi-supervised training iterations at block 208.

The process 200 may be repeated continuously or periodically to incorporate new customer data, adapt to evolving production conditions, or improve model accuracy over time. Although shown as a linear flow with optional feedback loops, the sequence of operations is merely illustrative, and additional or fewer steps may be included, and operations may be reordered or executed in parallel without departing from the scope of the present disclosure.

Figure 3:
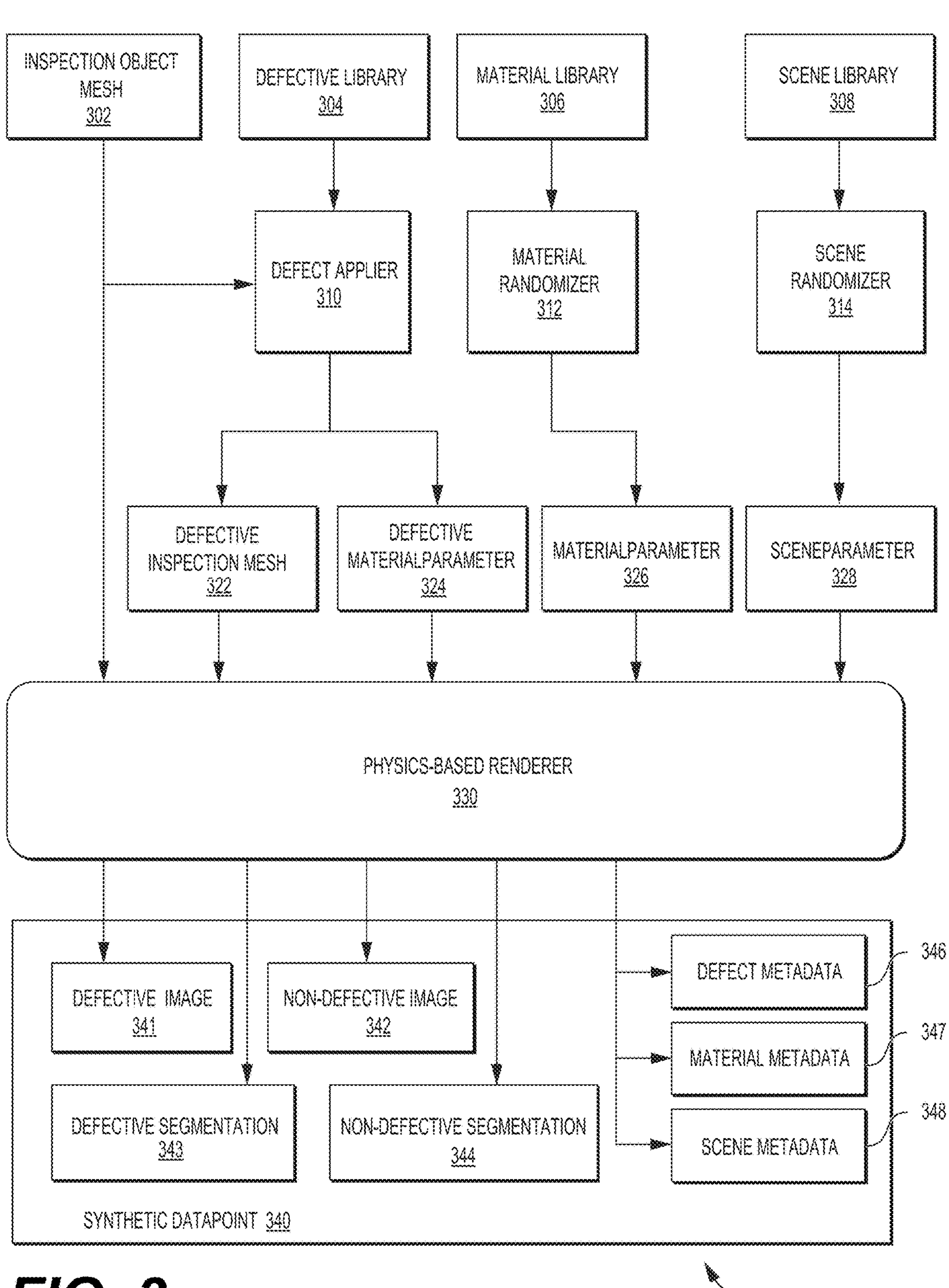
FIG. 3 is a block diagram illustrating a system architecture for generating a synthetic defect for training a defect detection model.

FIG. 3 illustrates an example system architecture 300 for generating synthetic datapoints that can be used in training a defect-detection model (e.g., machine learning model 130), according to some implementations of the present disclosure. The system architecture 300 may show how inspection object data, defect information, material parameters, and scene configurations can be combined and processed to produce paired defective and non-defective renders, segmentation outputs, and associated metadata forming a synthetic datapoint. One or more components of the architecture 300 (e.g., defect applier 310, material randomizer 312, scene randomizer 314, and/or physics-based renderer 330) may be part of the system 100 and/or may be implemented by one or more components of the system 100.

In some implementations, inspection object data (e.g., an inspection object mesh 302) may be provided as input to the system 100 (e.g., defect applier 310, physics-based renderer 330). The inspection object mesh 302 may be generated from customer-supplied CAD data or other geometric representations of an inspection object. The inspection object mesh 302 may define the geometry of the object to be rendered and provide abase structure onto which defects and material properties may be applied.

A defect library 304 may supply defect data representing one or more geometric or appearance-based defects that may occur during manufacturing. The defect library 304 may include defect-generation algorithms for geometric defects, such as flash or short-shot, as well as appearance-based defects such as discoloration, contaminants, burn marks, splay patterns, or in-mold-label distortions. The defect library 304 may be used by the system 100 (e.g., material randomizer 312, defect applier 310) to select one or more defects and associated parameter distributions for synthetic defect generation.

A material library 306 may store material definitions, shader configurations, base colors, reflectance parameters, and other properties describing how the inspection object surface may appear under rendering.

A scene library 308 may store background environments, lighting profiles, camera configurations, and other scene-level attributes used to vary rendering conditions and improve the robustness of the trained defect-detection model.

A defect applier 310 may receive the inspection object data (e.g., the inspection object mesh 302) and defect information from the defect library 304, and generate modified geometry and/or material properties representing a defective inspection object. Depending on the selected defect type, the defect applier 310 may output a defective inspection mesh 322 (for geometric defects) or defective material parameters 324 (for appearance-based defects). In some implementations, the defect applier 310 may simultaneously produce both types of outputs, for example, when one or more defects affect both geometry and material appearance.

A material randomizer 312 may receive material information from the material library 306 and may generate (randomized) material parameters 326. The material parameters 326 can be used to vary surface-level properties of the inspection object. Material randomization may include adjusting albedo, gloss, roughness, tint, reflectance, or other shader properties to simulate realistic production variability, environmental conditions, or sensor noise.

A scene randomizer 314 may receive scene information from the scene library 308 and generate scene parameters 328. The scene parameters 328 may define the rendering environment. For example, the scene parameters 328 may include randomized lighting conditions, shadow patterns, background objects, sensor configurations, or camera poses. Scene randomization may be used to enhance model robustness to real-world factory variation and to prevent overfitting to any single view or background.

The inspection object data (e.g., inspection object mesh 302) and the outputs of the defect applier 310, material randomizer 312, and scene randomizer 314 (e.g., defective inspection mesh 322, defective material parameters 324, material parameters 326, and/or scene parameters 328) may be provided to a physics-based renderer 330 to generate one or more synthetic datapoints 340. The physics-based renderer 330 may produce one or more views of the inspection object under identical lighting and scene conditions. In some implementations, the renderer 330 may generate a defective image 341 and a corresponding defective segmentation 343, and also generate a non-defective image 342 and a corresponding non-defective segmentation 344 based on the received data.

The defective segmentation 343 may comprise a pixel-level semantic segmentation map that identifies, for each pixel of the defective image 341, whether that pixel corresponds to background, to a non-defective portion of the inspection object, or to a specific defect region applied by the defect applier 310. In some implementations, the defective segmentation 343 may assign separate labels for each defect instance, each defect type, or each defect category, enabling precise spatial localization for use in supervised learning, difference-image analysis, and defect-visibility scoring.

The non-defective segmentation 344 may comprise a pixel-level semantic segmentation map generated from a version of the inspection object rendered without any applied defects. The non-defective segmentation 344 may similarly identify background and inspection-object pixels, but may not include any pixels labeled as defect regions. Because the respective non-defective image 342 is generated using the same scene parameters, camera pose, lighting configuration, and background geometry as the corresponding defective image 341, the non-defective segmentation 344 may provide an aligned, defect-free reference map for evaluating per-pixel differences between the defective and non-defective images. In some implementations, the non-defective segmentation 344 may also be used to identify regions of occlusion, shadowing, or poor illumination that could affect defect visibility.

In some implementations, the renderer 330 may generate at least one pair of a defective image and a corresponding non-defective image. The pair of the defective image and the corresponding non-defective image may be rendered with identical camera positions, lighting conditions, and scene environments, for example, to ensure that the applied defect represents the difference between the two images. As used herein, the term "defective image" may refer to an image of an inspection object in which at least one defect has been applied or simulated on the inspection object (e.g., defective object image). As used herein, the term "non-defective image" may refer to an image of an inspection object (e.g., a corresponding inspection object) in which no defects have been applied or simulated on the inspection object (e.g., non-defective object image).

In addition to visual render outputs, the renderer 330 may generate defect metadata 346, material metadata 347, and/or scene metadata 348. The defect metadata 346 may describe properties of the defect applied to the inspection object, including, for example, defect type, defect category, geometric extent, material extent, severity, size, surface area, volumetric properties, and the location of the defect on the inspection object. The material metadata 347 may describe material-related characteristics used or produced during rendering, including randomized or modified material parameters, such as base color, specular color, gloss, roughness, reflectance, texture variations, decal application parameters, and any material-level perturbations that influence the appearance of the inspection object. The scene metadata 348 may describe the rendering environment and scene-level parameters, including lighting conditions, light-source intensities, positions and orientations of cameras or sensors, background environment selection, placement of additional scene objects, randomized scene variations, and other scene-specific properties that can influence how the inspection object is visually rendered.

Figure 4:
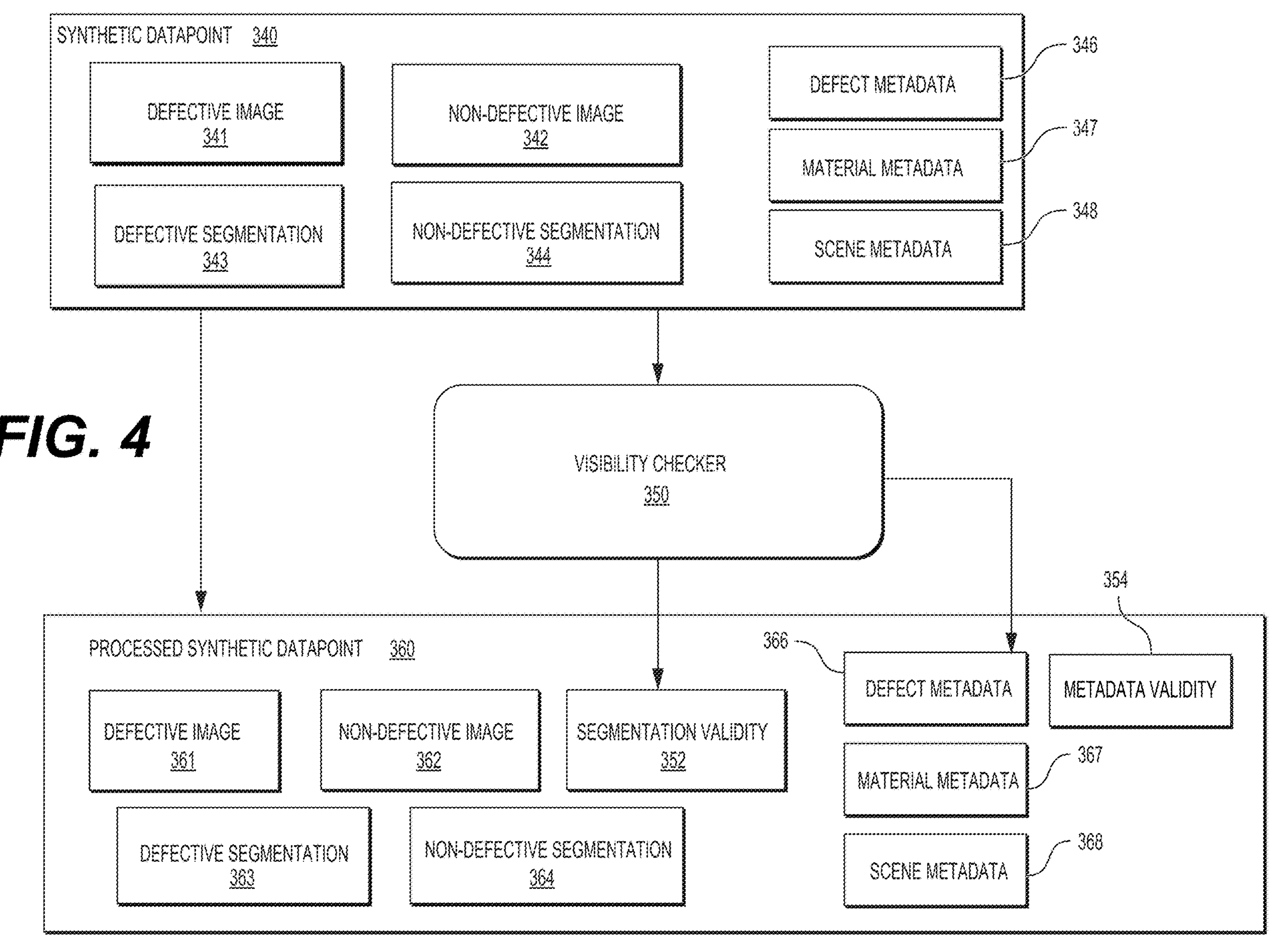
FIG. 4 is a block diagram illustrating a system architecture for generating a synthetic defect for training a defect detection model.

FIG. 4 illustrates an example system architecture 400 for performing visibility analysis on a synthetic datapoint and generating a processed synthetic datapoint that may include validity indicators for use during model training, according to some implementations of the present disclosure. One or more components of the system architecture 400 (e.g., visibility checker 350) may be part of the system 100 and/or may be implemented by one or more components of the system 100.

In some implementations, the synthetic datapoint 340 (described with respect to FIG. 3) may be provided as input to a visibility checker 350. For example, the visibility checker 350 may determine whether a defect applied in the defective image 341 is perceptible relative to the corresponding non-defective image 342 (e.g., in the same pair) under the rendered viewing conditions. In some implementations, the visibility checker 350 may compute a difference metric between the defective image 341 and the corresponding non-defective image 342, for example, within a region defined by the corresponding segmentations 343 and 344. The visibility checker 350 may generate a segmentation validity 352 output indicating whether the defect is visible, ambiguous, or invisible, based at least in part on one or more visibility thresholds, which will be discussed in more detail with respect to FIG. 5.

In addition to determining segmentation validity, the visibility checker 350 may also determine metadata validity 354, which may indicate whether the metadata associated with the synthetic datapoint may be used, retained, masked, or excluded during model training. Metadata validity 354 may reflect, for example, whether the defect metadata 346 may be treated as a positive training label, ignored, or discarded based on defect visibility categorization.

The results of the visibility analysis performed by the visibility checker 350 may be used to generate a processed synthetic datapoint 360. As illustrated, the processed synthetic datapoint 360 may include one or more of: a defective image 361, a non-defective image 362, a defective segmentation 363, a non-defective segmentation 364, and the segmentation validity 352.

In some implementations, the defective image 361, non-defective image 362, defective segmentation 363, and/or non-defective segmentation 364 may be a modified image of the defective image 341, non-defective image 342, defective segmentation 343, and/or non-defective segmentation 344, respectively. For example, the defective image 341, non-defective image 342, defective segmentation 343, and/or non-defective segmentation 344 may be modified based on the results of the visibility analysis (e.g., segmentation validity 352 and/or metadata validity 354). In other implementations, the defective image 361, non-defective image 362, defective segmentation 363, and/or non-defective segmentation 364 may be the same as the defective image 341, non-defective image 342, defective segmentation 343, and/or non-defective segmentation 344, respectively. The processed synthetic datapoint 360 may further include defect metadata 366, material metadata 367, and scene metadata 368, each potentially filtered, retained, or annotated based on the metadata validity 354.

In some implementations, when the visibility analysis indicates that a defect is visible, the associated defect metadata 366 may be retained for supervised training of a defect-detection model. When the visibility analysis indicates that the defect is ambiguous, the segmentation validity 352 and/or metadata validity 354 may indicate that the corresponding defect may be masked from loss computation for training the defect detection model. When the visibility analysis indicates that the defect is invisible, the segmentation validity 352 may indicate that the data regarding the corresponding defect may be excluded from training the defect detection model.

Although the components of FIGS. 3 and 4 are illustrated as discrete blocks, any combination of the described functions may be distributed, consolidated, or implemented using alternative processing architectures without departing from the scope of the present disclosure.

FIG. 5 illustrates an example method 500 for generating synthetic training data and determining whether synthetic defect information may be used, excluded, or masked for training a defect-detection model, according to some implementations of the present disclosure. The illustrated method may be performed by one or more components of the system 100, 300, and/or 400. Although FIG. 5 illustrates the method 500 as a series of sequential steps, the operations may be performed in a different order, repeated, omitted, or supplemented with additional operations without departing from the scope of the present disclosure.

At block 501, the method 500 may include generating defective inspection object data and defective material parameter data. For example, the one or more processors 115A-C may generate one or more defective inspection meshes 322 and defective material parameters 324 based on inspection object data (e.g., inspection object mesh 302), defect data obtained from the defect library 304, and data from the material library 306 (e.g., material data randomized by the material randomizer 312). In various implementations, the generated defective inspection object data 322 may represent geometric defects (e.g., flash, short-shot), and the defective material parameter data 324 may represent appearance-based defects (e.g., burn marks, contaminants, splay, label damage).

In some implementations, the system 100 may receive the inspection object data, defect data, and material data from one or more corresponding libraries. An inspection object library may store geometric models, CAD files, mesh representations, or other data defining the structure of the inspection object to be rendered. A defect library 304 may store parameterized definitions of defect types, defect-generation algorithms, or rule sets describing geometric or appearance-based defects applicable to various products. A material library may store shader definitions, material parameters, texture maps, color profiles, or surface-finish characteristics used during rendering. The generation of defective inspection object data and defective material parameter data may be based on the inspection object data, defect data, and material data retrieved from the respective libraries.

At block 502, the method may include generating at least one pair of a defective image and a corresponding non-defective image. For example, the one or more processors 115A-C may generate at least one pair of a defective image 341 and a corresponding non-defective image 342. The pair may be generated using the inspection object data 302, defective inspection object data 322, defective material parameters 324, material parameters 326, and scene parameter data 328. In some implementations, the defective image 341 may include a first image portion corresponding to a region in which at least one defect has been applied and a second image portion corresponding to a region of the inspection object without the applied defect.

The non-defective image 342 of the pair may include identical scene, lighting, and camera parameters but without any defects applied, ensuring that the difference between the two images (i.e., the pair of the defective image 341 and corresponding non-defective image 342) may result from the applied defect itself. For example, the non-defective image 342 of the at least one pair may include a third image portion corresponding to the first image portion of the defective image 341 and a fourth image portion that is the same as the second image portion of the defective image 341. The third image portion may correspond to the first image portion (e.g., in terms of the location within the inspection object) in which one or more defects have been applied and may not have the at least one defect of the inspection object. That is, the third image portion may be generated without applying any defects, thereby representing a defect-free reference region for evaluating visibility of the defect present in the corresponding portion of the defective image.

At block 503, the method 500 may include comparing the defective image with the non-defective image. For example, the one or more processors 115A-C may compare the defective image 341 with the non-defective image 342. The comparison may include performing a pixel-wise difference evaluation within a ground-truth defect-segmentation region to determine whether the defect applied in the defective image produces a perceptible change relative to the non-defective image. The ground-truth segmentation may identify the precise pixels of the defective image 341 that may correspond to a defect region applied by the defect applier 310. The pixel-wise comparison may include computing intensity differences, color-space differences, gradient differences, or other numerical metrics between aligned pixels of the defective and non-defective images.

In some implementations, a defective segmentation 343 (for a defective image 341) and a corresponding non-defective segmentation 344 (for a non-defective image 342 in the same pair with the defective image 341) may be paired together, and the one or more processors 115A-C may compare the defective segmentation 343 with the corresponding non-defective segmentation 344. In some implementations, the comparison of the defective image 341 with the non-defective image 342 may include the comparison of the defective segmentation 343 with the non-defective segmentation 344.

In some implementations, the comparison between the defective image 341 and the non-defective image 342 may include comparing the first image portion of the defective image 341 with the corresponding third image portion of the non-defective image 342. In some implementations, the comparison may include evaluating an expanded region that includes and surrounds the first image portion of the defective image 341 and comparing that expanded region with a corresponding region that includes and surrounds the third image portion of the non-defective image 342. Evaluating adjacent or surrounding regions may assist in determining defect visibility in cases where contrast or contextual cues extend beyond the immediate defect boundary. In some implementations, the expanded region may be from 1% to 10% larger than the first image portion. In other implementations, the expanded region may be increased by any other suitable amount relative to the first and third image portions.

At block 504, the method 500 may include generating a visibility score for the at least one defect based on the comparison of the defective image with the non-defective image. For example, the one or more processors 115A-C may generate a visibility score for the at least one defect based on the comparison of the defective image 341 with the non-defective image 342.

In various implementations, the visibility score may represent a magnitude of difference, a normalized contrast value, or any metric indicating how perceptible the defect is under the rendered scene conditions (e.g., an equation of the area times the average contrast at or around the location of the defect). The visibility score may be computed using pixel-wise differences, aggregated differences across the defect-segmentation mask, or combined differences across surrounding context regions.

At block 505, the method 500 may include classifying the visibility score as (i) a first category based on the visibility score being equal to or greater than a first visibility threshold value; (ii) a second category based on the visibility score being equal to or greater than a second visibility threshold value and less than the first visibility threshold value; and/or (iii) a third category based on the visibility score being less than the second visibility threshold value. For example, the one or more processors 115A-C may classify the visibility score into one of (i) a first category (e.g., visible category), in which the visibility score is equal to or greater than a first visibility threshold value; (ii) a second category (e.g., ambiguous category), in which the visibility score may be between a second visibility threshold value and the first visibility threshold value; and (iii) a third category, in which the visibility score is less than the second visibility threshold value.

The first category may indicate that the defect associated with the visibility score is sufficiently visible and may be treated as a valid defect label for supervised training. The second category may indicate that the defect associated with the visibility score is ambiguous and may be masked from loss computation for training purposes. The third category may indicate that the defect associated with the visibility score is not visible and may be excluded from training the defect detection model. This multi-threshold classification may support stable training by ensuring that visible defects that satisfy certain criteria contribute to supervised learning.

At block 506, the method 500 may include performing one or more training-data determination actions based on the classification. The training-data determination actions may include using the data regarding the at least one defect for training a defect-detection model and excluding the data regarding the at least one defect from training the defect-detection model. For example, the one or more processors 115A-C may use the data regarding the at least one defect (e.g., synthetic datapoint 360 or its defect label) for training the defect-detection model based on the visibility score being classified into the first category, or exclude the data regarding the at least one defect from training the defect-detection model based on the visibility score being classified into the third category. In some implementations, the one or more processors 115A-C may mask the at least one defect from loss computation for training the defect detection model based on the visibility score being classified into the second category. These actions may allow the defect-detection model to be trained on defects that satisfy certain criteria, while avoiding incorrect supervision associated with ambiguous or invisible defects.

In some implementations, masking a defect from loss computation may differ from excluding the defect from training altogether. For example, when a defect is masked from loss computation, the corresponding defect region may remain present within the synthetic datapoint provided to the training pipeline, but the defect region is omitted from contributing to the supervised loss function. In this manner, the model may continue to learn from other visible defects or non-defective regions contained within the same datapoint, while avoiding the introduction of inaccurate gradient updates associated with ambiguous defect regions. When a defect is excluded from training, the defect-related information may be omitted entirely from the supervised learning process, and the datapoint may either be treated as a non-defective sample or removed from the training dataset with respect to that defect instance. Exclusion therefore may prevent any direct or indirect influence of an imperceptible defect on model training, while masking may allow partial use of the datapoint without penalizing the model for uncertainty around the ambiguous defect.

In some implementations, the inspection object may include a plurality of defects applied during the synthetic data-generation process. Each defect may be associated with its own defect-segmentation, defect metadata, and defect parameters. When multiple defects are present, for example, within a single synthetic datapoint, the system 100 may determine a separate visibility score for each defect independently.

For example, the system 100 may identify each defect region within a defective image and perform a pixel-wise comparison with the corresponding region of the non-defective image. A visibility score may be generated for each defect, allowing the system 100 to classify each defect individually into a visible, ambiguous, or invisible category. This per-defect visibility evaluation may ensure that training-data determination actions, such as using, excluding, or masking labels, are applied correctly for each defect instance, even when multiple defects appear in the same rendered image/scene.

Figure 6:
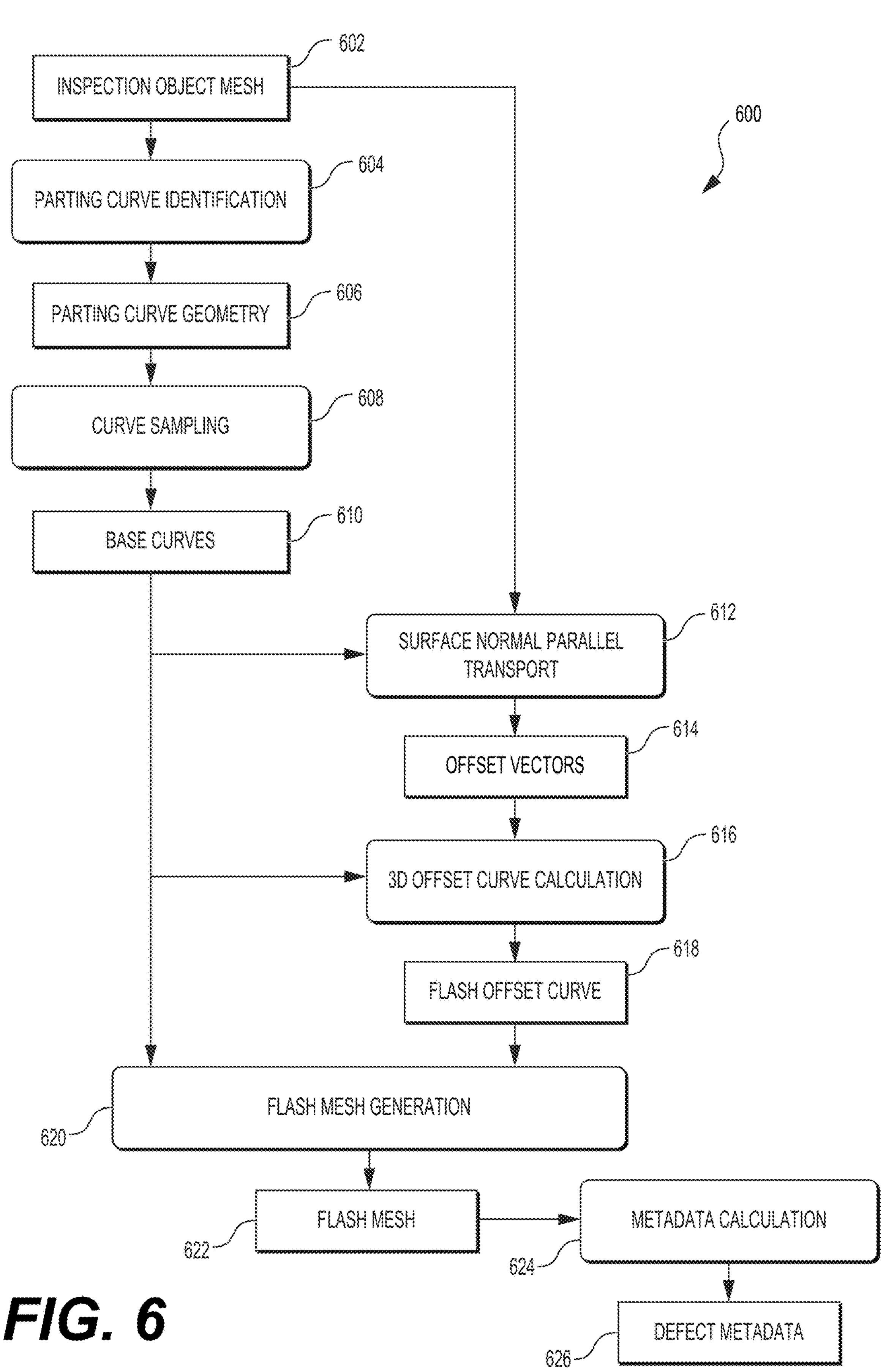
FIG. 6 is a flowchart illustrating a process for generating a synthetic defect for training a defect detection model.

FIG. 6 illustrates an example process 600 for generating a synthetic flash defect on an inspection object mesh, according to some implementations of the present disclosure. The illustrated process 600 may represent one implementation of a geometric-defect generator within a defect applier 310, specifically configured to generate flash (e.g., an excess-material defect commonly formed along mold parting lines during injection molding).

In the illustrated implementation, the process begins at block 602, where an inspection object mesh is provided. The inspection object mesh may represent a triangulated surface mesh derived from a CAD model supplied by a customer or retrieved from an inspection object library. The inspection object mesh may include surface geometry sufficient for identifying mold parting interfaces.

At block 604, the system 100 may perform parting curve identification to locate regions on the inspection object mesh corresponding to mold parting lines. This operation may analyze mesh connectivity, curvature, or other geometric features to identify candidate boundary curves where flash defects are likely to occur.

At block 606, the system 100 may determine parting curve geometry, producing one or more curves that may trace the parting-line regions on the mesh surface. These curves may serve as the foundation for subsequent sampling and offset operations.

At block 608, the system 100 may perform curve sampling, where discrete sample points or sub-curves may be selected along the parting-curve geometry. Sampling may ensure adequate coverage of the parting line while avoiding overlapping flash segments. The sampled portions may form a set of base curves 610, which may define the initial geometry that will be used to construct the flash defect.

At block 612, the system 100 may perform surface normal parallel transport along the base curves to determine a set of offset vectors 614. Parallel transport may maintain the orientation of the surface normal as it moves along the curve, allowing the system 100 to generate consistent outward offsets relative to the mesh surface.

Using the offset vectors 614 and the base curves 610, the system 100 may perform a 3D offset curve calculation at block 616 to produce a flash offset curve 618. The flash offset curve may represent a displaced version of the base curve, positioned outward from the inspection object surface to approximate the thin sheet of excess material that characterizes flash defects. In some implementations, self-intersections or irregularities in the offset curve may be resolved through cleanup operations.

At block 620, the system 100 may perform flash mesh generation using the base curves 610 and the flash offset curve 618. This may include generating a triangulated surface that bridges the two curves, which may create a geometry representing the flash defect. The resulting flash mesh 622 may be integrated into the defective inspection mesh and/or stored separately as defect geometry.

At block 624, the system 100 may perform metadata calculation for the generated flash defect. The metadata may include geometric properties, such as defect length, width, thickness, area, or stick-out distance, as well as information about the location of the flash relative to the inspection object. These computed parameters may be stored as defect metadata 626, which may be used for later visibility evaluation, model-training supervision, defect filtering, or customer reporting.

Although FIG. 6 illustrates one example of generating a flash defect, other geometric-defect types may be generated using similar processes with alternative curve-generation, offsetting, or surface-construction techniques. The steps shown in FIG. 6 may be performed in different orders, combined, or executed using alternative algorithms without departing from the scope of the present disclosure.

FIG. 7 illustrates example rendered images for the appearance of a manufacturing defect applied to an inspection object, according to some implementations of the present disclosure. Each of the views (a), (b), and (c) shows the same inspection object rendered under similar lighting and scene conditions, with variations in defect placement or defect geometry for illustrative purposes.

In view (a), the inspection object is shown without an applied defect. This view may represent a baseline non-defective rendering. In view (b), the inspection object is shown with an applied defect, such as an outward protrusion, surface irregularity, excess-material flash, or a geometric inconsistency along an edge or parting line. In view (c), the inspection object's material properties have been applied to the simulated flash geometry in (b). Applying material properties may allow the flash defect to blend naturally into the rendered object, producing a realistic synthetic defect that can be used for training and visibility checking.

Figure 8:
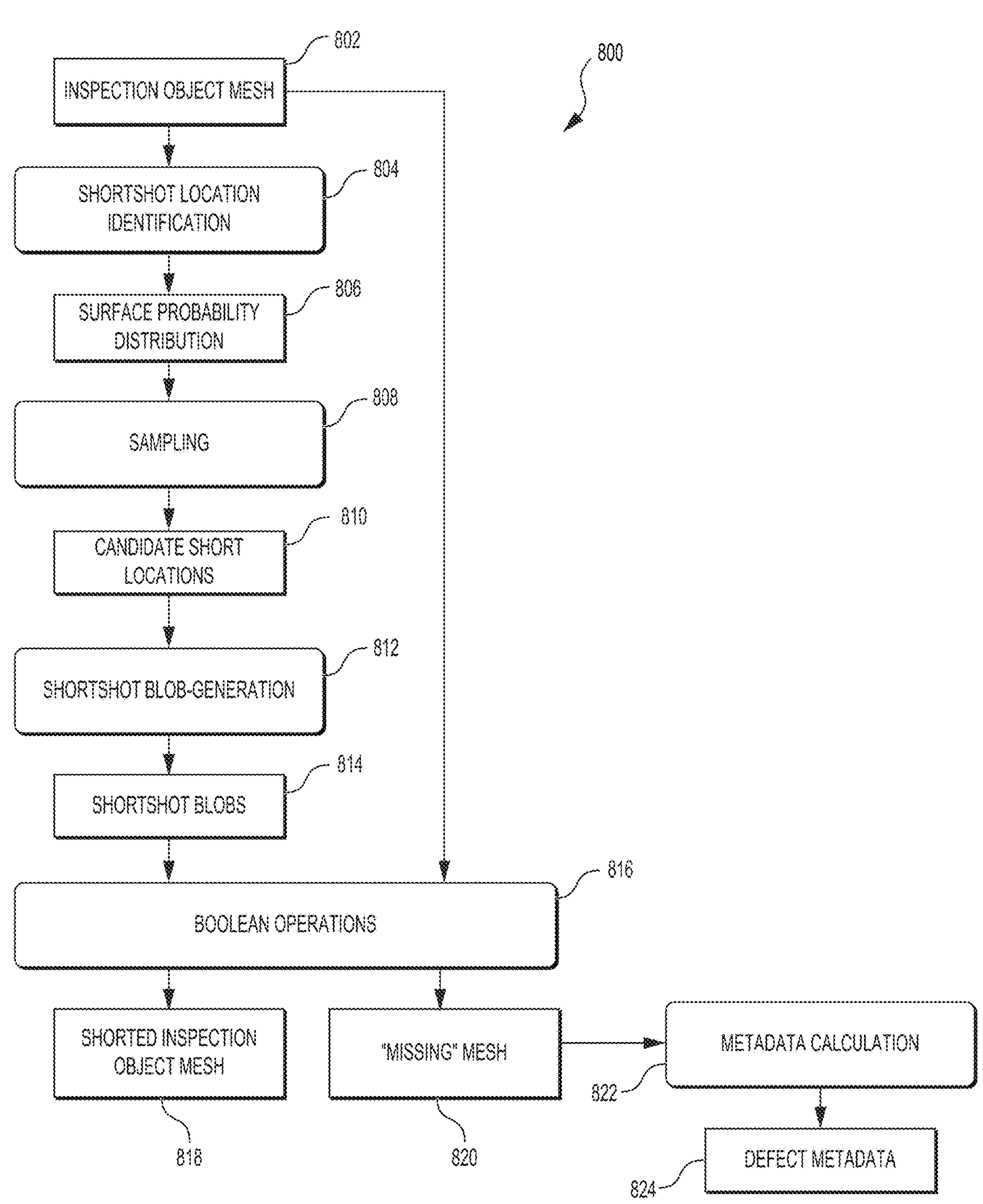
FIG. 8 is a flowchart illustrating a process for generating a synthetic defect for training a defect detection model.

FIG. 8 illustrates an example method 800 for generating a synthetic short-shot defect on an inspection object mesh, according to some implementations of the present disclosure. A short-shot defect may represent a destructive geometric defect where molten material fails to completely fill a mold cavity, resulting in missing material on the final part. The illustrated process 800 may represent one implementation of a geometric-defect generator within the defect applier 310, specifically configured to generate a short-shot defect.

The process begins at block 802, where an inspection object mesh is provided. The inspection object mesh may represent a triangulated surface mesh derived from a CAD model or another geometric representation of the part being inspected.

At block 804, the system 100 may perform short-shot location identification. This step may identify regions of the inspection object mesh that are likely candidates for short-shot defects based on manufacturing characteristics. In various implementations, based on this identification, the system 100 may generate surface-probability distributions 806, which may be derived from heuristics, such as distance from injection gates, thickness variations, geometric bottlenecks, or prior defect occurrence patterns.

At block 808, the system 100 may perform sampling over the probability distribution 806 to generate candidate short-shot locations 810. Each sampled location may represent a region on the inspection object mesh where missing material could plausibly occur.

At block 812, the system 100 may perform short-shot blob generation, producing a set of short-shot blobs 814. Each blob may be a volumetric geometric structure (e.g., a sphere, ellipsoid, or other parametric solid) that may represent the volume of material to be removed from the inspection object mesh. The size, shape, and orientation of the blob may be parameterized or randomized to simulate a range of defect severities and geometries.

At block 816, the system 100 may perform Boolean operations between the generated blobs 814 and the inspection object mesh 802 to compute a defective inspection object geometry and/or geometry describing the missing material. This Boolean (subtraction) operation may remove the regions of the mesh that intersect with the blobs, generating a shorted inspection object mesh 818. The Boolean operations may also generate a complementary "missing" mesh 820, representing the material volume removed from the original part. Separation of the defective mesh and removed-material mesh may enable accurate calculation of defect metrics.

At block 822, the system 100 may perform metadata calculation using the missing-material geometry 820 and/or the shorted inspection object mesh 818. The resulting defect metadata 824 may include defect parameters, such as missing-material volume, defect surface area, orientation, depth, and/or counts of individual short-shot regions. This metadata can be used for downstream visibility checking, defect categorization, and ground-truth labeling for training the defect-detection models.

The stages depicted in FIG. 8 provide an example of how destructive geometric defects may be algorithmically generated for synthetic data preparation. Although the figure illustrates one implementation for short-shot defect generation, other defect types may be produced through similar sampling, volumetric construction, and Boolean-operation processes. The steps shown may be executed in different orders or replaced with alternative mesh-modification techniques without departing from the scope of the present disclosure.

Figure 9:
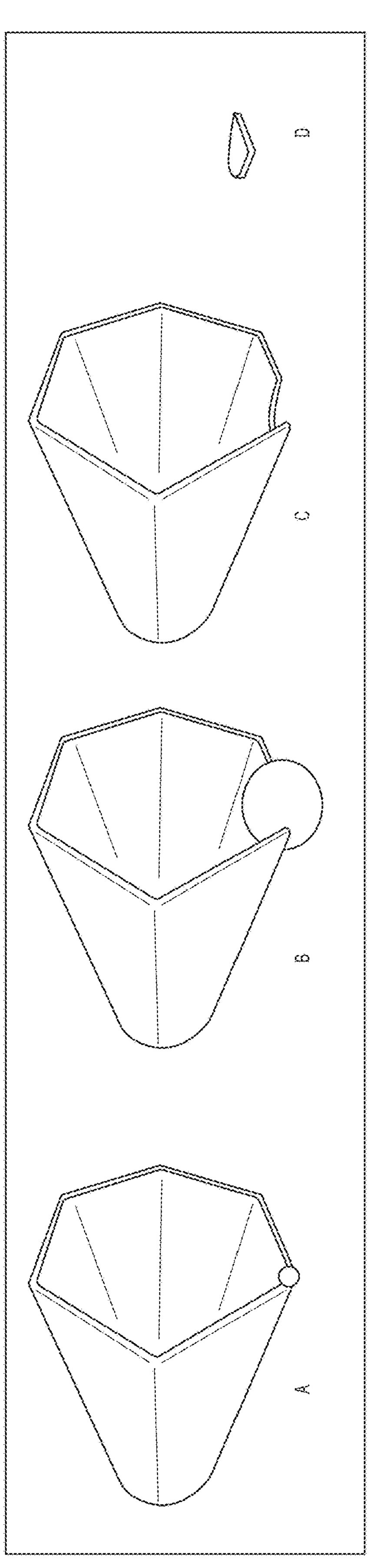
FIG. 9 illustrates example rendered images showing the process for generating a simulated short-shot defect.

FIG. 9 illustrates example renderings 900 for the short-shot defect generation process on an inspection object, according to some implementations of the present disclosure. The sequence of views (a) through (d) visually represents different stages of identifying a short-shot location, generating a volumetric blob representing missing material, and performing Boolean subtraction to create the resulting defective geometry.

In view (a), a representative inspection object is shown without any short-shot defect applied. This image corresponds to the original inspection object mesh prior to the introduction of any destructive geometric modifications. In view (b), a short-shot blob may be generated at a candidate short-shot location on the inspection object. The blob may represent a volume of material that would be missing from the injection-molded part due to incomplete mold filling. As described with respect to FIG. 8, the blob may be generated based on sampled surface-probability distributions and may vary in size, shape, and orientation.

In view (c), the shorted inspection object mesh is shown after the system 100 performs a Boolean subtraction operation between the inspection object mesh and the short-shot blob. The result is a defect region where the blob has been removed, simulating a realistic short-shot void consistent with manufacturing defects observed in injection molding.

In view (d), the "missing" mesh corresponding to the removed material volume is shown separately. This mesh may represent the geometry of the material that would have occupied the defect region in the absence of a short-shot defect. The missing mesh may be used for generating defect metadata, including missing-material volume, surface area, defect depth, and other parameters relevant to defect characterization and visibility evaluation.

In addition to geometric defects, various manufacturing defects associated with injection-molded components may be modeled by modifying the material properties of the inspection object rather than altering its geometry. These appearance-driven defects may be simulated by applying one or more two-dimensional ("2D") material decals or shader-parameter adjustments to the surface of the inspection object. Decal-based modifications may enable efficient simulation of visual defects that arise from surface contamination, thermal effects, flow instabilities, or in-mold-label deformation.

In some implementations, contaminant decals may be applied to represent particulates, smudges, embedded impurities, or localized discolorations. The contaminant decals may modify material parameters, such as base color, specular color, or local reflectance over small, localized surface patches. The decal placement may be determined by sampling locations from a distribution defined over the surface of the inspection object, for example, by uniform random sampling or by sampling informed by historical contamination patterns.

In some implementations, burn-mark decals may be applied to simulate thermal or chemical discoloration associated with overheating, incomplete venting, or material degradation. Burn-mark decals may decrease or increase parameters, such as base-color saturation, luminance, or specular intensity at one or more sampled regions on the surface of the inspection object. The locations for burn-mark decals may be determined using candidate regions identified for other defect types (e.g., short-shot defect-candidate areas), or may be randomly sampled across the inspection object surface.

In some implementations, splay decals may be applied to simulate streak-like visual disturbances, for example, caused by moisture, trapped gas, or flow instabilities in molten plastic. Splay decals may be generated by altering material parameters to increase specular reflectance and reduce the base-color saturation in elongated streaks aligned with an estimated material-flow direction. The flow direction may be computed based on geometric features of the inspection object, for example, using surface-geodesic estimation or other flow-mapping heuristics. The decal locations may be sampled along the surface based on the estimated flow paths.

In some implementations, appearance-driven defects may also include in-mold-label (IML) defects. IML defects may arise when a decorative or informational label embedded within the mold becomes damaged, warped, or misaligned during the molding process. Various IML defects may be simulated. For example, bubbles and wrinkles may be represented using decals applied to the surface region corresponding to the in-mold label. The decals may introduce localized distortions or texture variations, which may be randomized to simulate variability in bubble or wrinkle formation. In some implementations, label-destruction defects may be simulated by modifying or replacing the underlying texture associated with the in-mold label, for example, by altering texture opacity, introducing missing fragments, or injecting shader-based irregularities to represent torn or degraded label regions.

These appearance-driven defect simulations allow the system to efficiently generate realistic synthetic examples of surface-level defects while avoiding complex geometric operations. The resulting material-modification parameters may be passed to a renderer as part of the defective material parameters, facilitating the generation of defect-visible and defect-invisible image pairs for use in visibility checking and training of a defect-detection model.

Figure 10:
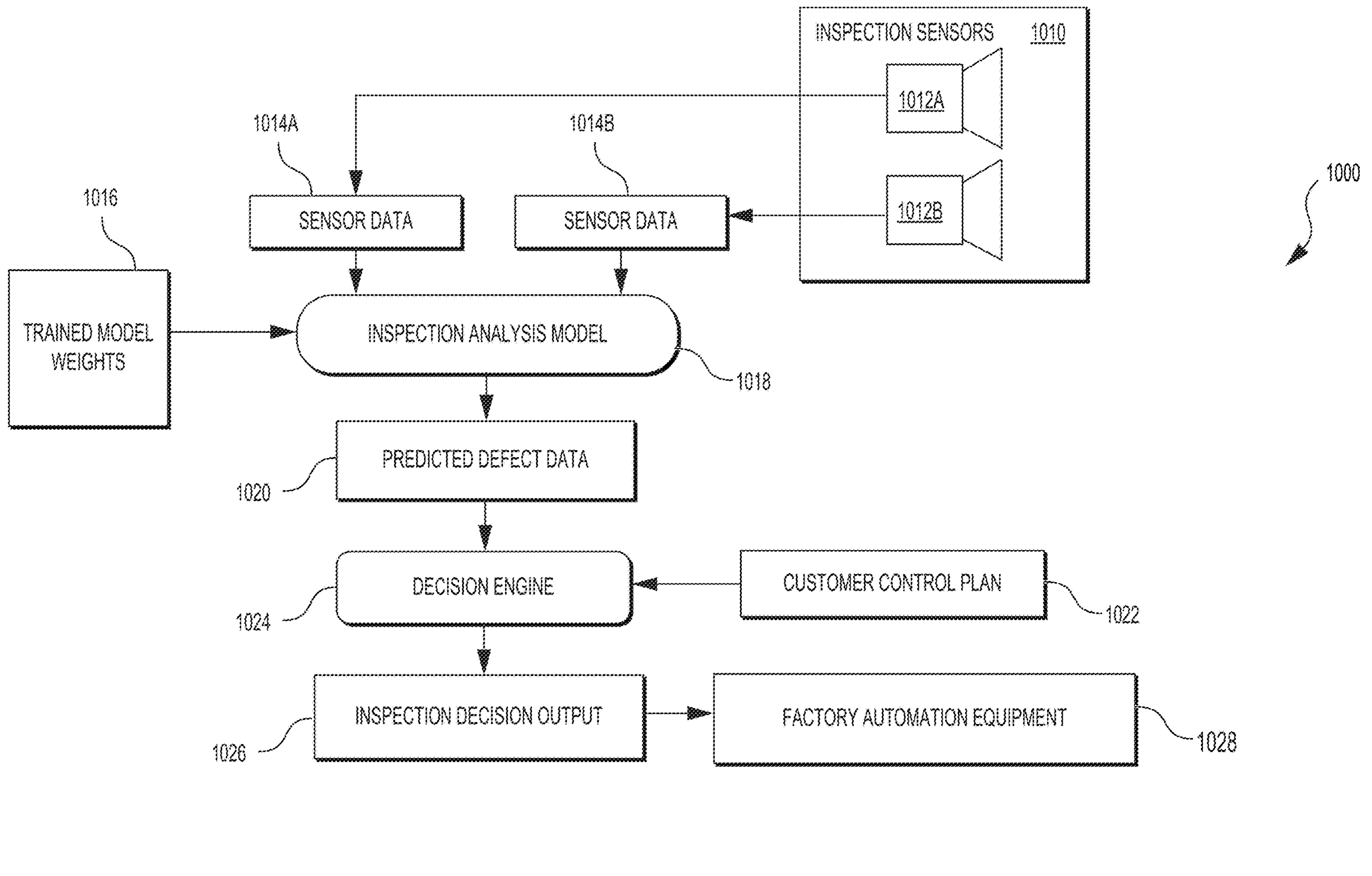
FIG. 10 is a block diagram illustrating a system for performing in-factory defect detection and automated rejection decision-making.

FIG. 10 illustrates an example system 1000 for performing in-factory defect detection and automated rejection decision-making using a trained defect-detection model, according to some implementations of the present disclosure. In some implementations, the system 1000 may be implemented using one or more components of the system 100 (e.g., processor device(s) 110, storage(s) 120, machine learning model 130). The system 1000 may include one or more inspection sensors 1012A-B, an inspection analysis model 1018, a decision engine 1024, and/or factory automation equipment 1028 to enable real-time quality inspection of manufactured parts.

In the illustrated implementation, one or more inspection sensors 1010 may be positioned within an inspection cell along a manufacturing line. The inspection sensors 1010 may include one or more imaging devices, such as first inspection sensor 1012A and second inspection sensor 1012B. Examples of the inspection sensors 1012A, 1012B may include RGB cameras, depth sensors, thermal cameras, hyperspectral sensors, polarized-light sensors, or combinations thereof. Each inspection sensor may capture image or sensor data of the inspection object as the object passes through the inspection station.

The one or more inspection sensors 1012A-B may output sensor data 1014A-B, which may be transmitted to the inspection analysis model 1018. In some implementations, the inspection analysis model 1018 may be a neural network or a machine learning model, such as the defect detection model trained using synthetic datapoints generated according to the methods described herein.

The inspection analysis model 1018 may be initialized or updated using trained model weights 1016. The trained model weights 1016 may be generated during the training of the defect detection model. The trained model weights 1016 may be stored locally (e.g., in the storage device 120) or retrieved from a remote system.

Based on the input sensor data 1014A-B, the inspection analysis model 1018 may produce predicted defect data 1020. The predicted defect data 1020 may include a global prediction and/or a spatial prediction. The global prediction may be computed at the level of the inspection object and describe whether each defect category may be present and, if so, the estimated severity of that defect. These outputs may provide object-level defect classification and severity scoring. The spatial prediction may be produced in the coordinate domain of the sensor modality. For vision-based inputs, the inspection analysis model 1018 may generate a two-dimensional segmentation mask indicating the precise pixel regions where each defect may be detected. In other configurations, spatial predictions may be produced in three-dimensional coordinates or another sensor-specific representation.

The combined outputs of the inspection analysis model 1018, including global and spatial predictions, may provide a complete description of the defect state for the inspection object. These outputs can be post-processed and aggregated with metadata, such as defect type, size, and location to support automated decision-making in downstream inspection and rejection systems.

The predicted defect data 1020 may be provided to a decision engine 1024. The decision engine 1024 may evaluate the predicted defect data 1020 in combination with a customer control plan 1022. The customer control plan 1022 may specify acceptable defect types, go/no-go thresholds for defect severity, dimensional tolerances, and other quality-control parameters particular to the customer's manufacturing specifications. The decision engine 1024 may apply these rules to determine whether the inspected part meets required quality standards.

Based on the predicted defect data 1020, the decision engine 1024 may generate an inspection decision output 1026. For example, if the predicted defect data 1020 indicates that one or more identified defects exceed the specified acceptance thresholds, the decision engine 1024 may output a rejection decision. If the predicted defect data 1020 indicates that any identified defects fall within the allowable limits specified in the customer control plan 1022, or that no defects are detected, the decision engine 1024 may output an allowance or pass decision indicating that the inspected part satisfies the required quality criteria. In some implementations, a combination of the inspection analysis model 1018, the trained model weights 1016, and/or the decision engine 1024 may constitute the defect detection model trained using synthetic datapoints generated according to the methods described herein.

The inspection decision output 1026 may be communicated to the factory automation equipment 1028. The factory automation equipment 1028 may include robotic actuators, ejector mechanisms, diverter arms, conveyors, or other machinery configured to physically remove, flag, or reroute defective parts. For example, a pass decision may cause the factory automation equipment 1028 to permit the part to continue along the production line, while a rejection decision may cause the equipment to redirect or remove the part.

In some implementations, the system 1000 may operate in real time, with sensor data captured and processed within the cycle time of the manufacturing equipment. The architecture illustrated in FIG. 10 may also support optional feedback mechanisms in which misclassifications or operator overrides are logged for future model refinement or semi-supervised training.

It will be appreciated that some implementations may utilize one or more specialized processors (or "processing devices") such as microprocessors, digital signal processors, customized processors, and field programmable gate arrays (FPGAs) along with unique stored program instructions (including software and/or firmware) that control the one or more processors to implement, in conjunction with certain non-processor circuits, some, most, or all of the functions of the method and/or apparatus described herein. Alternatively, some or all of these functions could be implemented using a state machine without stored program instructions, or through one or more application specific integrated circuits (ASICs), where each function or some combinations of certain of the functions are implemented as custom logic. A hybrid approach combining these techniques may also be employed.

Moreover, an implementation may take the form of a computer-readable storage medium having computer readable code stored thereon for programming a computer (e.g., including a processor) to perform a method as described and/or claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Furthermore, one of ordinary skill, notwithstanding possibly significant effort and many design choices motivated by, for example, available time, current technology, and economic considerations, when guided by the concepts and principles disclosed herein will be readily capable of generating such software instructions and programs and ICs.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

In some implementations, all of the functions of the respective processor/machine learning model/unit/module/system discussed in the present disclosure may be performed by a single processor. In other implementations, the functions of the respective processor/machine learning model/unit/module/system may be distributed among multiple processors (e.g., one processor performs a subset of the functions of the respective processor/machine learning model/unit/module/system while one or more other processors perform the remaining functions of the respective processor/machine learning model/unit/module/system).

While the present disclosure contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

The invention claimed is:

1. A method for training a defect-detection model for inspecting an inspection object, the method comprising:

generating, by one or more processors, first data indicative of a defective inspection object and second data indicative of a defective material parameter;

generating, by the one or more processors, at least one pair of a defective object image and a non-defective object image based on inspection object data, the first data, the second data, and scene parameter data, wherein the defective object image of the at least one pair includes a first image portion with at least one defect of an inspection object, and a second image portion without the at least one defect of the inspection object, comparing, by the one or more processors, the defective object image with the non-defective object image, generating, by the one or more processors, a visibility score of the at least one defect based on the comparison of the defective object image with the non-defective object image, classifying, by the one or more processors, the visibility score as:

(i) a first category based on the visibility score being equal to or greater than a first visibility threshold value;

(ii) a second category based on the visibility score being equal to or greater than a second visibility threshold value and less than the first visibility threshold value; or (iii) a third category based on the visibility score being less than the second visibility threshold value; and based on the classification of the visibility score of the at least one defect, performing, by the one or more processors, one or more training-data determination actions, wherein the one or more training-data determination action comprises using data regarding the at least one defect for training a defect-detection model and excluding the data regarding the at least one defect from training the defect-detection model.

2. The method of claim 1, wherein the non-defective object image of the at least one pair includes a third image portion corresponding to the first image portion of the defective object image and without the at least one defect of the inspection object, and a fourth image portion that is a same as the second image portion of the defective object image.

3. The method of claim 1, comprising receiving, by the one or more processors, inspection object data, defect data from a defect library, and material data from a material library, wherein generating the first data and the second data comprises generating the first data and the second data based on the inspection object data, the defect data, and the material data.

4. The method of claim 1, wherein comparing the defective object image with the non-defective object image comprises comparing the defective object image and the non-defective object image within a ground-truth defect segmentation mask using a pixel-wise difference metric.

5. The method of claim 1, wherein the at least one defect comprises a plurality of defects, wherein generating the visibility score of the at least one defect comprises generating the visibility score for each of the plurality of defects.

6. The method of claim 1, wherein using the data regarding the at least one defect for training the defect-detection model comprises using the data regarding the at least one defect for training the defect-detection model based on the visibility score being classified into the first category.

7. The method of claim 1, wherein excluding the data regarding the at least one defect from training the defect-detection model comprises excluding the data regarding the at least one defect from training the defect-detection model based on the visibility score being classified into the third category.

8. The method of claim 1, wherein the one or more training-data determination actions comprise masking the at least one defect from loss computation for training the defect detection model based on the visibility score being classified into the second category.

9. A system for training a defect-detection model for inspecting an inspection object, the system comprising:

memory;

one or more processors in communication with the memory, wherein the one or more processors are configured to:

generate first data indicative of a defective inspection object and second data indicative of a defective material parameter;

generate at least one pair of a defective object image and a non-defective object image based on inspection object data, the first data, the second data, and scene parameter data, wherein the defective object image of the at least one pair includes a first image portion with at least one defect of an inspection object, and a second image portion without the at least one defect of the inspection object, compare the defective object image with the non-defective object image, generate a visibility score of the at least one defect based on the comparison of the defective object image with the non-defective object image, classify the visibility score as:

(i) a first category based on the visibility score being equal to or greater than a first visibility threshold value;

(ii) a second category based on the visibility score being equal to or greater than a second visibility threshold value and less than the first visibility threshold value; or (iii) a third category based on the visibility score being less than the second visibility threshold value; and based on the classification of the visibility score of the at least one defect, perform one or more training-data determination actions, wherein the one or more training-data determination action comprises using data regarding the at least one defect for training a defect-detection model and excluding the data regarding the at least one defect from training the defect-detection model.

10. The system of claim 9, wherein the non-defective object image of the at least one pair includes a third image portion corresponding to the first image portion of the defective object image and without the at least one defect of the inspection object, and a fourth image portion that is a same as the second image portion of the defective object image.

11. The system of claim 9, wherein the one or more processors are configured to receive inspection object data, defect data from a defect library, and material data from a material library, wherein generating the first data and the second data comprises generating the first data and the second data based on the inspection object data, the defect data, and the material data.

12. The system of claim 9, wherein comparing the defective object image with the non-defective object image comprises comparing the defective object image and the non-defective object image within a ground-truth defect segmentation mask using a pixel-wise difference metric.

13. The system of claim 9, wherein the at least one defect comprises a plurality of defects, wherein generating the visibility score of the at least one defect comprises generating the visibility score for each of the plurality of defects.

14. The system of claim 9, wherein using the data regarding the at least one defect for training the defect-detection model comprises using the data regarding the at least one defect for training the defect-detection model based on the visibility score being classified into the first category.

15. The system of claim 9, wherein excluding the data regarding the at least one defect from training the defect-detection model comprises excluding the data regarding the at least one defect from training the defect-detection model based on the visibility score being classified into the third category.

16. The system of claim 9, wherein the one or more training-data determination actions comprise masking the at least one defect from loss computation for training the defect detection model based on the visibility score being classified into the second category.

17. One or more non-transitory computer-readable storage media including instructions that, when executed by one or more processors, cause the one or more processors to:

generate first data indicative of a defective inspection object and second data indicative of a defective material parameter;

generate at least one pair of a defective object image and a non-defective object image based on inspection object data, the first data, the second data, and scene parameter data, wherein the defective object image of the at least one pair includes a first image portion with at least one defect of an inspection object, and a second image portion without the at least one defect of the inspection object, compare the defective object image with the non-defective object image, generate a visibility score of the at least one defect based on the comparison of the defective object image with the non-defective object image, classify the visibility score as:

(i) a first category based on the visibility score being equal to or greater than a first visibility threshold value;

(ii) a second category based on the visibility score being equal to or greater than a second visibility threshold value and less than the first visibility threshold value; or (iii) a third category based on the visibility score being less than the second visibility threshold value; and based on the classification of the visibility score of the at least one defect, perform one or more training-data determination actions, wherein the one or more training-data determination action comprises using data regarding the at least one defect for training a defect-detection model and excluding the data regarding the at least one defect from training the defect-detection model.

18. The one or more non-transitory computer-readable storage media of claim 17, wherein the non-defective object image of the at least one pair includes a third image portion corresponding to the first image portion of the defective object image and without the at least one defect of the inspection object, and a fourth image portion that is a same as the second image portion of the defective object image.

19. The one or more non-transitory computer-readable storage media of claim 17, wherein comparing the defective object image with the non-defective object image comprises comparing the defective object image and the non-defective object image within a ground-truth defect segmentation mask using a pixel-wise difference metric.

20. The one or more non-transitory computer-readable storage media of claim 17, wherein the one or more training-data determination actions comprise masking the at least one defect from loss computation for training the defect detection model based on the visibility score being classified into the second category.

* * * * *